United States Patent
Huang

(10) Patent No.: US 6,797,160 B2
(45) Date of Patent: Sep. 28, 2004

(54) PERCOLATING STEEPER

(76) Inventor: I-Chung Huang, P.O. Box 6-57, Chung-Ho, Taipei 235 (TW)

( * ) Notice: Subject to any disclaimer, the term of this patent is extended or adjusted under 35 U.S.C. 154(b) by 186 days.

(21) Appl. No.: 09/976,088

(22) Filed: Oct. 15, 2001

(65) Prior Publication Data

US 2003/0070979 A1 Apr. 17, 2003

(51) Int. Cl.$^7$ ................................................ A47J 31/18
(52) U.S. Cl. ........................ 210/117; 210/241; 210/471; 99/289 P; 99/302 P; 99/323; 99/297
(58) Field of Search ................................ 210/117, 241, 210/464–468, 470–471; 99/289, 289 P, 299, 302 P, 323, 300, 297; 206/0.5; 137/247.21, 544, 547, 549–550; 220/592.16–692.17, 714; 222/110–111

(56) References Cited

U.S. PATENT DOCUMENTS

| | | | |
|---|---|---|---|
| 1,962,493 A | * | 6/1934 | Ferris ........................... 99/299 |
| 2,053,021 A | * | 9/1936 | Cassol .......................... 99/287 |
| 5,544,566 A | * | 8/1996 | Bersten ......................... 99/287 |
| 5,725,765 A | * | 3/1998 | Shen ........................... 210/238 |
| 5,943,946 A | * | 8/1999 | Chen ........................... 99/297 |

* cited by examiner

Primary Examiner—Terry K. Cecil
(74) Attorney, Agent, or Firm—Troxell Law Office PLLC

(57) ABSTRACT

A percolating steeper comprises a carafe, a filter layer situated inside the carafe moving up and down for compressing the infused substance, a control element for controlling the movement of the filter layer, an isolating layer for inhibiting the water convection, at least one free moving non-return unit and one passive non-return unit are disposed on the isolating layer; the control element connects with the isolating layer by means of the passive non-return unit to move in different direction from that of the free moving non-return unit, wherein, the tight unit of the isolating layer and the tight point of the carafe are higher than the lowest feed water surface in the lower aspect of the isolating layer for conducting the fluid to the valve hole; through the elevation difference, when the substance and the fluid separate from each other, a visual effect of clear air isolation is generated.

12 Claims, 5 Drawing Sheets

PERCOLATING STEEPER

BACKGROUND OF THE INVENTION

1) Field of the Invention

The present invention of a percolating steeper is another invention of the inventor's previous claim of "Pot with Filter Arrangement" of U.S. Pat. No. 09,705,827.

The present invention of a percolating steeper, aiming to address the shortcomings and improve the design of a general percolating steeper structure used for steeping the tea leaves, the herb tea, the fruit tea and the coffee, in terms of not being able to control the concentration of the infusion and using too many utensils, is invented as the design of a second percolating steeper using a single utensil to achieve the separation between the fluid and the substance as well as to control the concentration of the infusion.

2) Description of the Prior Art

Accordingly, the oriental art of steeping the tea has been very popular in the world and tea drinking has become a part of the life for most people. In addition to steeping the tea leaves, other kinds of most frequently used substance for steeping and infusing a beverage include the fruit tea, the Chinese herb tea such as the chrysanthemum tea regarded as a daily cool and or warm tonic beverage, the ginseng infusion and the hot brewed coffee. The utensils used for steeping usually come in two styles, one for directly steeping and infusing the fluid with the substance to be infused, the other for separating the infused liquid from the infused substance for drinking. The method of directly infusing the fluid and the infused substance together for drinking can't control the concentration of the beverage because the substance is continuously infused in the infusion. That means, the longer the infusing time is, the stronger and bitterer the infusion will be. For example, the correct taste of the tea leaves, after being infused for a longer time, will lose and become bitter as well as astringent; as the same, the longer the fruit tea is infused, the sweeter and stronger the infusion will be; therefore, if the infusion is not consumed right away, the infused substance can't generate the right taste; the carafe and the filter cup of another kind of structure need to be separated from each other in order to separate the infusion from the infused substance; therefore, when the filter cup is removed from the carafe, the water of the infused substance in the filter cup may easily drip from the filter hole and stain the table top; furthermore, since the utensil are used separately, it is not convenient to store or use them.

In view of the mentioned reasons, although the design of the inventor's previous claim of "Pot with Filter Arrangement" of U.S. Pat. No. 09,705,827 is capable of being used as a single utensil of a percolating steeper to separate the infusion and the substance, the phenomenon of air isolation generated during the separation of the infusion and the substance is influenced by the necessary exchange with the outside air and that fails to meet the sanitary requirement.

SUMMARY OF THE INVENTION

The primary object of the present invention of a percolating steeper is to have an isolating layer disposed on the filter layer, with a free moving non-return unit and a passive non-return unit disposed thereon for providing the water to go in and out; every unit has a valve hole penetrating through the isolating layer; the position of a tight unit on the circumferential rim of the isolating layer contacting a carafe is higher than the lowest feed water surface of the isolating layer; in addition to having the free moving and passive non-return units to control the feeding and dispensing of the liquid, the elevation difference formed by the tight unit and the lowest water feed surface of the isolating layer generate a visual effect of air isolation.

The second object of the present invention of a percolating steeper is to have a cover body situated on the isolating layer of both the free moving non-return unit and the passive non-return unit, a valve body and a valve door situated inside the cover body, a valve hole disposed at the said valve door and penetrated through the isolating layer, thereby, feeding and dispensing the liquid from different directions can be achieved by using the result of different non-return direction.

The third object of the present invention of a percolating steeper is to dispose a protruding body at the lowest end of the isolating layer to make the lowest feed water surface situate at the lower end of the protruding body.

The fourth object of the present invention of a percolating steeper is to directly dispose the filter layer at the lowest feed water area or in the lower aspect of the isolating layer to keep a distance from the valve hole for not interfering the feeding of the infusion.

The fifth object of the present invention of a percolating steeper is to design the said protruding body to combine with the isolating layer for having a protruding body of simplified structure, being convenient for mounting, dismounting, cleaning and being replaced by other protruding bodies with different heights.

DETAILED DESCRIPTION OF THE PREFERRED EMBODIMENTS

Figure 1:
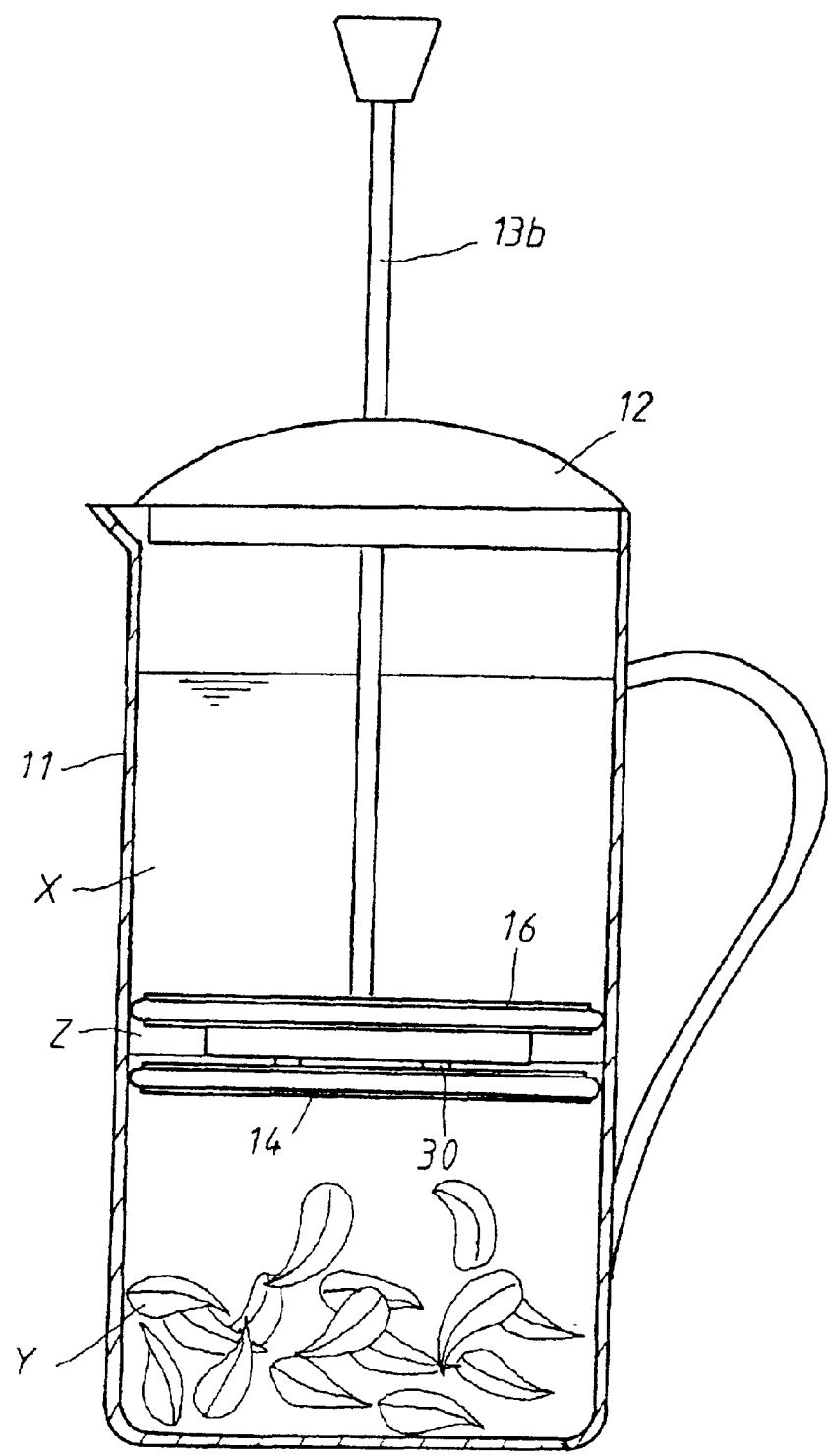
FIG. 1 is a drawing of the embodiment of the present invention.

The reason for the present invention of a percolating steeper to be able to generate an effect of air isolating, as shown in FIG. 1, is that whether a control element (13b) is moving upward or downward to control an isolating layer (16) or a filter layer (14), an obvious air (Z) isolating effect is always generated in the lower aspect of the isolating layer (16), thereby provides the user with the fact of the actual separation of the liquid and the substance; wherein, the isolating area of said air (Z) is always inside a carafe (11) after the isolating layer (16) is placed in the carafe (11); therefore, when in use, it is not necessary to contact with the outside air to make exchange movement as required for the previous claim; thus the sanitation of the beverage is maintained and that is why the improved design of the present invention is superior than and different from the previous claim.

Figure 7:
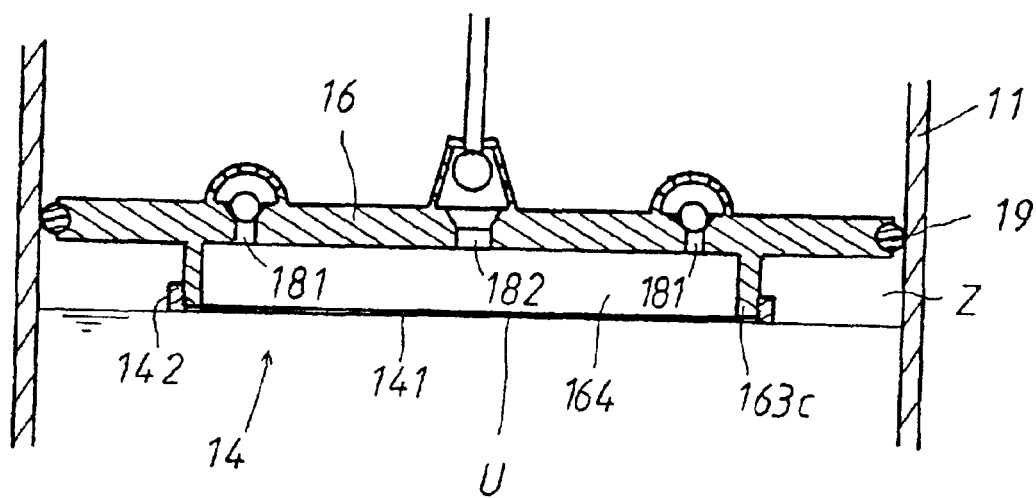
FIG. 7 is a drawing of an exemplary embodiment of another filter layer combined with a ring-shaped protruding body of the isolating layer of the present invention.

The present invention of a percolating steeper, wherein, the isolating layer (16) links the filter layer (14) to directly locate the filter layer (14) in the lower aspect of the isolating layer (16) of a free moving non-return unit (17); or according to the designing need, at least one connecting member (30) is disposed therein; the connecting member (30) can be a column-shaped hollow rod with holes; or a larger liquid flow space can be designed to form between the isolating layer (16) and the filter layer (14) to prevent the infused substance from blocking the infusion to flow in and out the free moving non-return unit (17); however, the connecting member (30) can be excluded by making the filter layer (14) directly connect the lowest feed water surface (U) of the isolating layer (16) or the bottom end of the protruding body (163), as shown in the exemplary embodiment in FIG. 7 and that design will be described later.

Figure 5:
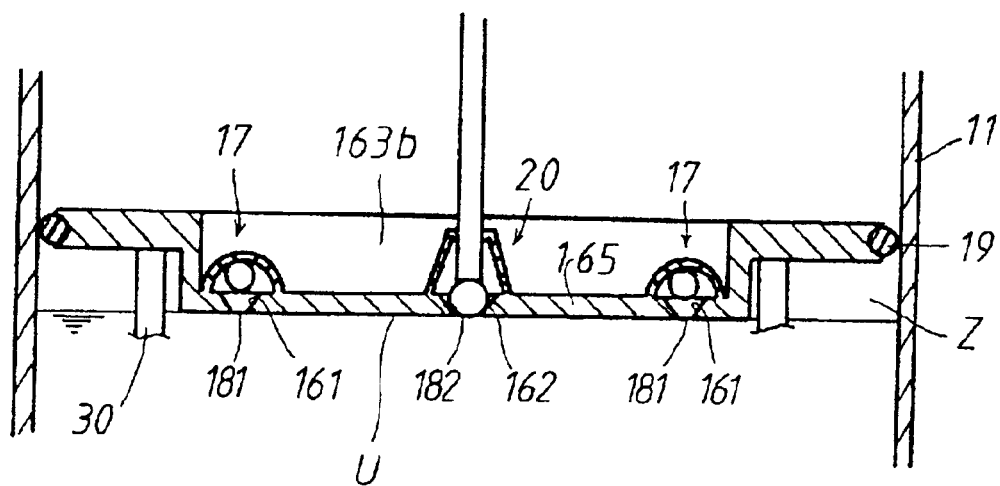
FIG. 5 is a drawing of an exemplary embodiment of another valve door and valve hole at the same location.

Wherein, the disposition of the connecting member (30) for connecting the isolating layer (16) with the filter layer (14) is not limited by the position of the valve hole (181, 182), it can be located near the central position or on the circumferential rim as shown in FIG. 5.

Figure 2:
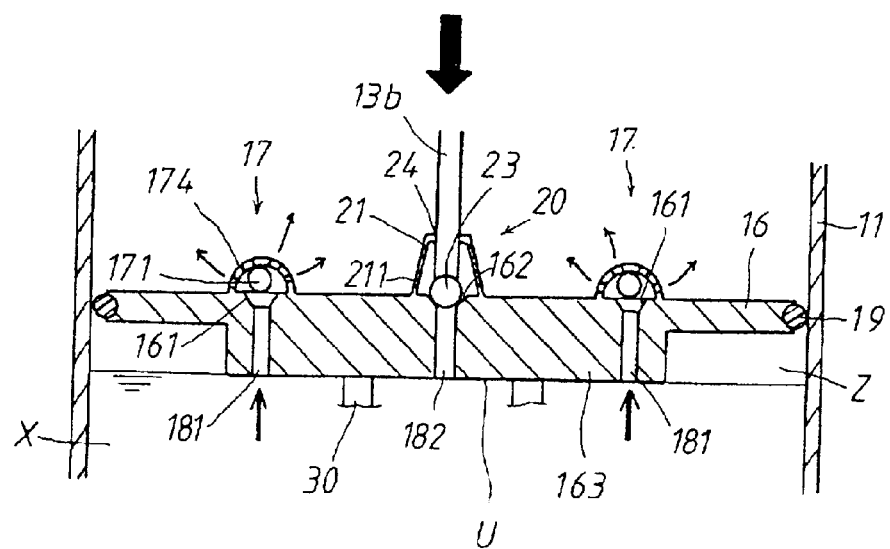
FIG. 2 is a cross-sectional view drawing of the present invention in downward movement.

As shown in the exemplary embodiment in FIG. 2, a passive non-return unit (20) and a free moving non-return unit (17) are disposed on the isolating layer (16); basically, the passive non-return unit (20) has the functions of connecting the isolating layer (16) with the control element (13b) and enabling the control element (13b) to directly work on the isolating layer (16), thereby the free moving non-return unit (17) and the passive non-return unit (20) control the infusion (X) to flow in and out.

The passive non-return unit (20) uses a cover body (21) with several holes (211) to cover on the isolating layer (16); a valve door (162) is formed on the isolating layer (16) relative to the position of the cover body (21); the valve door (162) shown in the exemplary embodiment in this Figure is in the shape of a circular taper hole; a valve hole (182) is formed below the valve door (162) to penetrate through the lowest feed water surface (U) of the isolating layer (16); a hole (24) disposed on the cover body (21) is provided for the control element (13b) to move into position; the bottom end of the control element (13b) is situated inside the cover body (21) and connects with a valve body (23); the valve body (23) fitly joints with the valve door (162) into a sealed state; the exemplary embodiment in the Figure indicates that the valve body (23) and the valve door (162) reach a tight closure together by fitting a spherical shape with a taper hole.

The direct linking method of the control element (13b) and the valve body (23) is shown in the exemplary embodiment in FIG. 2; since the volume of the valve body (23) is bigger than the size of the hole (24) of the cover body (21), under the control of the control element (13b), the valve body (23) can only either move in the space inside the cover body (21) or tightly close with the valve door (162); in order to make the working control element (13b) enable the valve body (23) moving downward to maintain a closed recoil resilience with the valve door (162), a resilient unit such as a spring can be disposed between the valve body (23) and the control element (13b).

The free moving non-return unit (17) of the isolating layer (16) is also disposed with a cover body (174) with several holes and a valve body disposed inside; a valve door (161) is disposed at the position relative to the isolating layer (16) to enable the valve body (171) to move inside the cover body (174); as the same, the valve door (161) is also disposed with a valve hole (181) penetrating through the isolating layer (16) all the way to the lowest feed water surface (U).

Figure 6:
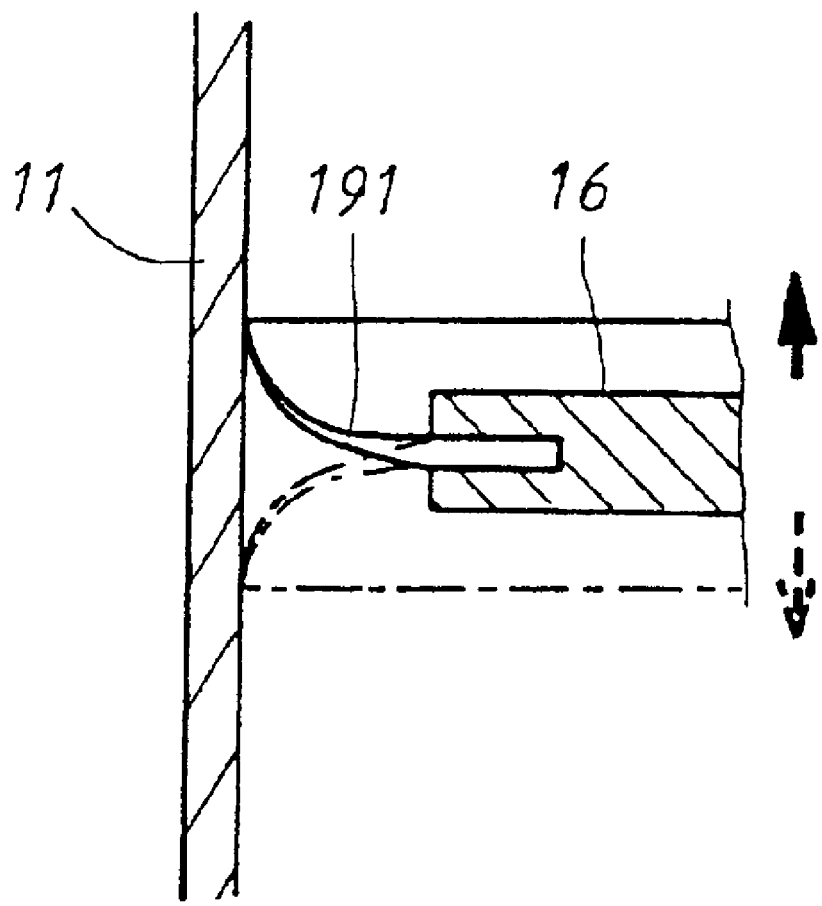
FIG. 6 is a drawing of an exemplary embodiment of a tight unit of a soft ring-shaped piece of the present invention.

Furthermore, a tight unit (19) is disposed on the outer rims of the isolating layer (16) and the filter layer (14) to form a tight point with the carafe (11) for preventing the fluid from flowing in and out in-between; wherein the said tight unit (19) can be designed as a conventional O-shaped ring as shown in FIG. 2, or as a soft ring-shaped piece (191) bent and attached onto the carafe (11) as shown in FIG. 6; thus, the tight unit (19) and the carafe (11) are in a surface contact; when the tight unit (19) moves upward, the said soft ring-shaped piece (191) turns downward, bends and attaches onto the carafe (11) as shown in the dotted lines; as a matter of fact, the O-shaped ring or soft ring-shaped piece (191) are only the exemplary embodiments for preventing the liquid from permeating the tight unit (19).

Figure 3:
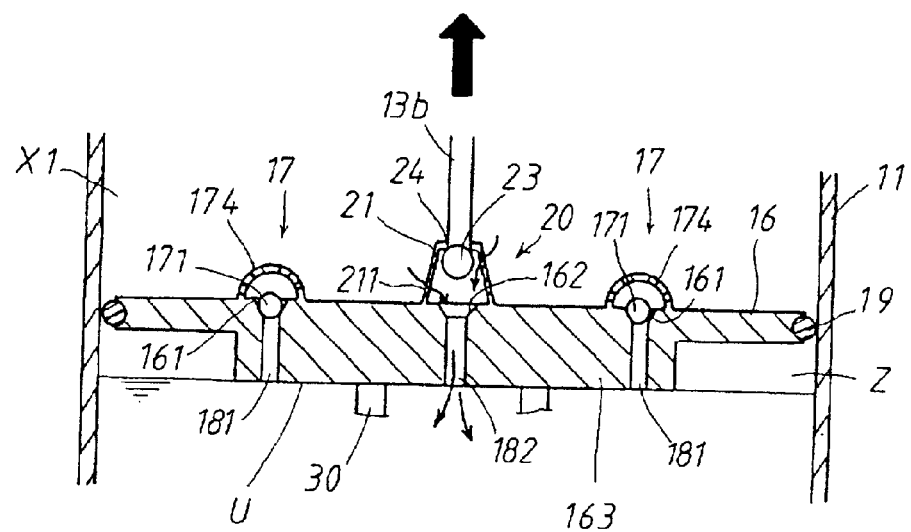
FIG. 3 is a cross-sectional view drawing of the present invention in upward movement.

The reason for the present invention of a percolating steeper capable of generating an isolating effect of the constant air (Z) between the lowest feed water surface (U) of the isolating layer (16) and the tight unit (19), as shown in FIGS. 2 and 3, is that a protruding body (163) is disposed in the lower aspect of the isolating layer (16) to make the lowest feed water surface (U) situate at the lower end area of the protruding body (163); in addition, the lower end openings of the valve holes (181, 182) penetrate through the protruding body (163); therefore, by having the protruding body (163) protruding the isolating layer (16) in a certain distance, the lowest feed water surface (U) and the tight unit (19) generate a distance difference and that results in the isolating effect of the air (Z) as shown in the Figure.

Figure 4:
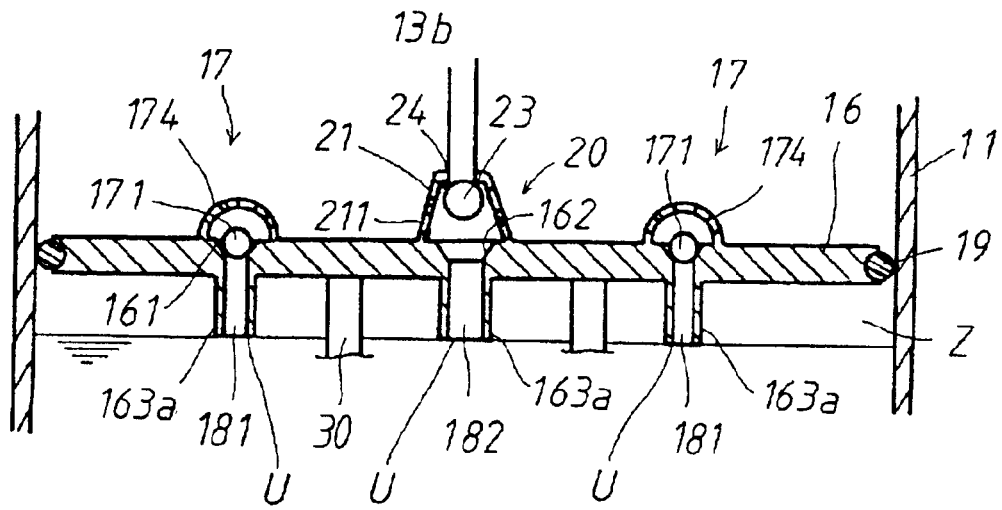
FIG. 4 is a drawing of an exemplary embodiment of the tube-shaped valve hole of the present invention.

Therefore, it is understandable that the purpose of the design of the said protruding body (163) is to lead the lower end openings of the valve holes (181, 182) to the lowest feed water surface (U) in the lower aspect of the isolating layer (16) and thereby to form a certain elevation difference; therefore, the design of the said protruding body (163) can be a tube-shaped protruding body (163a), as shown in FIG. 4, for guiding the lower end openings of the valve holes (181, 182) to the lowest feed water surface (U) in order to generate an elevation difference; as to the indication in FIG. 5, another kind of concave design of a protruding body (163b) makes the valve doors (161, 162) and the valve holes (181, 182) situate on the bottom plane (165) together thereby defines the lower portion of the bottom plane (165) as the lowest feed water surface (U) of the isolating layer (16) and achieves the object of having an elevation difference with the tight unit (19).

Since the valve hole (181) is the doorway for the fluid to flow in and out, the size of the filter layer (14) thereof does not need to be too large as long as it is capable of inhibiting the infused substance (Y) from blocking the valve holes (181, 182); therefore, the filter layer (14) can be designed accordingly with the protruding body (163) of the isolating layer (16), as shown in the exemplary embodiment in FIG. 7, a ring-shaped protruding body (163c) is formed below the isolating layer (16) while the valve holes (181, 182) do not situate along with the same position of the bottom end of the ring-shaped protruding body (163c); in that case, the bottom end of this ring-shaped protruding body (163c) is the lowest feed water surface (U) of the isolating layer (16) (as the exemplary embodiment shown in the Figure, the lower end openings of the valve holes (181, 182) situate on the isolating layer (16); but the other kind of design can make the lower end openings of the valve holes (181, 182) situate within the area of the ring-shaped protruding body (163c)), and a feed liquid space (164) is formed between the ring-shaped protruding body (163c) and the valve holes (181, 182); thereby, as long as the said filter layer (14) is situated at the lower end opening (the lowest feed water surface (U))

of the ring-shaped protruding body (163c), the liquid feed space (164) makes the lower end openings of the valve holes (181, 182) and a filter screen (141) of the filter layer (14) maintain a certain distance in-between, thus the filtering object of preventing the infused substance (Y) from blocking the lower end openings of the valve holes (181, 182) can be achieved; the design of the said filter layer (14) located below the isolating layer (16) allows the filter screen (141) to be directly and fixedly disposed below the ring-shaped protruding body (163c) for directly conducting the filtering movement; or, a dismountable design for combining with the ring-shaped protruding body (163c) can be adapted, as shown in the exemplary embodiment in FIG. 7, that is, the filter screen (141) of the filter layer (14) is fixedly positioned inside a ring-shaped cover body (142) permitting the ring-shaped cover body (142) to be screwed onto the ring-shaped protruding body (163c); of course this implemental method of mounting the filter layer (14) to the ring-shaped protruding body (163c) can be designed by other methods such as rotary retaining.

Since both valve holes (181, 182) situate on the isolating layer (16), the ring-shaped protruding body (163c) can be either unitarily molded or detachably combined (screwed), not shown, with the isolating layer (16). As shown in FIG. 7, the filter layer (14) is positioned directly on the ring-shaped protruding body (163c) so as to facilitate dismounting and cleaning. The pre-determined height of the ring-shaped protruding body (163c) is selected according to the need, thereby the elevation difference between the ring-shaped protruding body (163c) and the tight unit (19) is changed as well for achieving various visual effects of changing the interval distance of the air (Z).

As a matter of fact, since the valve hole (182) controlled by the passive non-return unit (20) functions for conducting the water on the isolating layer (16) to enter the lower portion, the required elevation difference between it and the tight unit (19) is not as important as that for the valve hole (181) of the free moving non-return unit (17).

According to the implemental method of the present invention of the percolating steeper, the control element (13b) moves downward to make both the isolating layer (16) and the filter layer (14) move downward simultaneously, via directly the coordinately close contact between the valve body (23) and the valve door (162), to compress the infused substance (Y) at the lower portion; referring to FIGS. 1 and 2, at this time, the infusion (X) at the lower portion enters from the lower end opening of the valve hole (181) through the filter layer (14) and the lowest feed water surface (U) of the isolating layer (16), passes the valve door (161) of the free moving non-return unit (17), moves upward until the infused substance (Y) is pressed to a certain position and thus causes the beverage infusion (X) to locate in the upper aspect of the isolating layer (16) and the infused substance (Y) locate in the lower aspect of the isolating layer (16); therefore, the effect of separating the infusion from the substance is achieved as well as an air (Z) isolation is obviously generated between the tight unit (19) and the lowest feed water surface (U) of the isolating layer (16) to accomplish the actual efficiency of visible separation between the infusion and the substance; thereby, the user can drink the steeped infusion (X) located on the upper layer while the infused substance staying on the lower layer; when trying to conduct the steeping again, after adding new liquid (X1) onto the isolating layer (16) to pull the control element (13b) upward, as shown in FIG. 3, the control element (13b) first moves the valve body (23) upward to separate it from the close relationship with the valve door (162) until it presses upward against the hole (24) area of the cover body (21), then drives the filter layer (14) and the isolating layer (16) to move upward; at this time, under the hydraulic pressure of the liquid (X1) on the upper portion, the free moving non-return unit (17) is in a closed state while the vacuum on the lower portion, through the valve door (162) of the isolating layer (16), conducts the liquid (X1) on the upper portion to the space of the infused substance (Y) for steeping; therefore, the proper position of the isolating layer (16) in the water inside the carafe (11) is controlled according to the amount of infusion; at this time, the control element (13b) is released, the isolating layer (16) stops moving, the free moving non-return unit (17) closes under the hydraulic pressure on the upper layer while the valve door (162) of the passive non-return unit (20) is also in a closed state due to the free downward movement of the valve body (23) of the control element (13b); after the infusion (X) on the lower portion reaches the needed concentration, the movement shown in FIG. 2 is conducted to make the control element (13b) move downward again and to make the infusion (X) on the lower portion enter the top portion of the isolating layer (16) to be drunk; or, according to the user's preference, part of the infusion (X) can enter the upper portion of the isolating portion (16) and part of it continuously infuses with the infused substance (Y) for reaching different tastes of various concentrations to satisfy the drinking need.

By virtue of these procedures, not only the object of actually separating the substance from the fluid is achieved, but the concentration of the infusion (X) is also obtained by controlling the steeping time for the infused substance (Y) according to the drinker's need so the undesired taste of the infused substance (Y) of being bitter, astringent, too strong or too sweet, due to being infused too long with the same infusion (X) caused by non-man-made factor, can be prevented; in addition, an obvious air (Z) isolating effect is also generated.

The present invention of a percolating steeper, is capable of not only separating the infusion from the infused substance to prevent the infused substance from being infused for too long so as to achieve the controlling of the beverage concentration, but also achieving the visual effect of using the air to obviously isolate the substance and the fluid; the present invention is sanitary, has simplified structure, is convenient for storage and easy to use, can specifically improve the inconvenience of the structure and usage of the available percolating steeper, has obvious practical value as well as the economic efficiency and is hereby submitted to the patent bureau for review and granting the commensurate patent rights.

The forgoing example is one of the best embodiments of the present invention, any change, modification or alternation with equal efficiency based on the example and not exceeding the feasible scope of the present invention should be included in the scope of the claim application of the present invention.

What is claimed is:

1. A percolating steeper, comprises a carafe, a cover body, a filter layer, an isolating layer and a control element, and further comprising a tight unit disposed on a circumferential rim of the isolating layer to contact the carafe, and at least one free moving non-return unit and one passive non-return unit disposed on the isolating layer, the control element indirectly controlling downward or upward movement of the isolating layer and the filter layer by means of the at least one passive non-return unit, and both the at least one free-moving non-return unit and the at least one passive non-return unit comprising a cover body with holes; a valve body situated in a valve door formed on the isolating layer wherein the valve door comprises a valve hole which extends through the isolating layer, and the tight unit of the isolating layer and the tight point of the carafe are disposed higher than the lowest feed water surface in a lower end surface of the isolating layer being used for conducting liquid into the valve hole and with this elevation difference, the visual effect of air isolation is generated when a substance and an infusion is separated.

2. A percolating steeper according to claim 1, wherein a protruding body is disposed at the lower end of the isolating layer and the lower end of the protruding body is defined as the lowest feed water surface.

3. A percolating steeper according to claim 2, wherein the valve hole penetrates through the protruding body.

4. A percolating steeper according to claim 2, wherein the protruding body had a tube shape and is penetrated by the valve hole.

5. A percolating steeper according to claim 2, wherein the protruding body is concave to make the lower end opening of the valve hole situate on the bottom plane thereof.

6. A percolating steeper according to claim 2, wherein the protruding body has a ring shape to situate the valve hole inside the ring-shaped protruding body to at least maintain a certain distance with the lowest feed water surface.

7. A percolating steeper according to claim 1, wherein the filter layer and the isolating layer are connected as one unit.

8. A percolating steeper according to claim 1, wherein the filter layer and the isolating layer are detachably combined with each other.

9. A percolating steeper comprising a carafe, a cover body, a filter layer, an isolating layer and a control element, and further comprising a protruding body disposed below the isolating layer and a tight unit is disposed on a circumferential rim of the isolating layer to contact the carafe, and at least one free moving non-return unit and one passive non-return unit disposed on the isolating layer, the control element indirectly controlling downward or upward movement of the isolating layer and the filter layer by means of the at least one passive non-return unit, and both the at least one free moving non-return unit and the at least one passive non-return unit comprising a cover body with holes, a valve body is situated in a valve door formed on the isolating layer, wherein the valve door comprises a valve hole which extends through the isolating layer to let a fluid flow in and out, and the protruding body having a ring shape, a lower end of the valve hole and lower end area of the ring-shaped protruding body maintaining a certain, and the filter layer being situated adjacent to the lower end area of the ring-shaped protruding body.

10. A percolating steeper according to claim 9, wherein the filter layer is disposed in an opening at a lower end of the ring-shaped protruding body and filter layer comprises a filter screen.

11. A percolating steeper according to claim 9, wherein the filter screen of the filter layer is disposed inside a ring-shaped cover body; the ring-shaped cover body is assembled with the protruding body to make the filter screen situate at the lower end opening of the ring-shaped protruding body.

12. A percolating steeper according to claim 9, wherein the ring-shaped protruding body and the isolating layer are detachably assembled.

* * * * *